US012581138B2

(12) United States Patent
Jiang

(10) Patent No.: US 12,581,138 B2
(45) Date of Patent: *Mar. 17, 2026

(54) LIVE ROOM VIDEO PLAYBACK

(71) Applicant: SHANGHAI BILIBILI TECHNOLOGY CO., LTD., Shanghai (CN)

(72) Inventor: Lulu Jiang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/622,723

(22) Filed: Mar. 29, 2024

(65) Prior Publication Data

US 2024/0276031 A1      Aug. 15, 2024

Related U.S. Application Data

(63) Continuation of application No. PCT/CN2022/097808, filed on Jun. 9, 2022.

(30) Foreign Application Priority Data

Nov. 4, 2021      (CN) .......................... 202111298165.8

(51) Int. Cl.
*H04N 21/2187*      (2011.01)
*H04N 21/439*      (2011.01)
(52) U.S. Cl.
CPC ..... *H04N 21/2187* (2013.01); *H04N 21/4396* (2013.01)

(58) Field of Classification Search
CPC ....................... H04N 21/2187; H04N 21/4396
See application file for complete search history.

(56) References Cited

U.S. PATENT DOCUMENTS

| | | | |
|---|---|---|---|
| 2007/0143791 A1* | 6/2007 | Sammarco ......... | H04N 21/4316 |
| | | | 725/38 |
| 2020/0285439 A1* | 9/2020 | Chen ....................... | G06F 21/51 |
| 2024/0370156 A1* | 11/2024 | Hu ......................... | G06F 3/0481 |

FOREIGN PATENT DOCUMENTS

| | | |
|---|---|---|
| CN | 103702214 A | 4/2014 |
| CN | 106162232 A | 11/2016 |
| CN | 106572379 A | 4/2017 |
| CN | 106791953 A | 5/2017 |
| CN | 108419117 A | 8/2018 |
| CN | 108900911 A | 11/2018 |

(Continued)

OTHER PUBLICATIONS

PCT Search Report issued in the counterpart PCT Application No. PCT/CN2022/097808, official mailing date Sep. 2, 2022, 4 pages.

(Continued)

*Primary Examiner* — Nnenna N Ekpo
(74) *Attorney, Agent, or Firm* — FisherBroyles, LLP

(57)      ABSTRACT

This application discloses a live room video playback method. The method includes: in response to detecting that a user enters a live room playback page, playing a live video by using a first video player; in response to detecting that an enable instruction of a floating window mode is received, creating a second video player; exiting the live room playback page, and destroying the first video player; and playing the live video in a floating manner by using the second video player.

17 Claims, 4 Drawing Sheets

(56)  References Cited

FOREIGN PATENT DOCUMENTS

| | | | | | |
|---|---|---|---|---|---|
| CN | 108900914 | A | | 11/2018 | |
| CN | 109451341 | A | | 3/2019 | |
| CN | 109491753 | A | | 3/2019 | |
| CN | 109831688 | A | | 5/2019 | |
| CN | 110324693 | A | | 10/2019 | |
| CN | 110891193 | A | * | 3/2020 | .......... H04N 21/431 |
| CN | 111107415 | A | | 5/2020 | |
| CN | 112437326 | A | | 3/2021 | |
| CN | 112788427 | A | | 5/2021 | |
| CN | 113542886 | A | | 10/2021 | |
| CN | 113873316 | A | | 12/2021 | |
| CN | 114040243 | A | | 2/2022 | |
| WO | 2017201860 | A1 | | 11/2017 | |

OTHER PUBLICATIONS

Search Report issued in the counterpart CN Application No. 202111298165.8, dated May 26, 2023, 2 pages.
First Office Action with Search Report issued in the counterpart CN Application No. 202111298165.8, dated Jun. 1, 2023, 6 pages.
Second Office Action with Search Report issued in the counterpart CN Application No. 202111298165.8, dated Aug. 30, 2023, 10 pages.
Third Office Action with Search Report issued in the counterpart CN Application No. 202111298165.8, dated Nov. 30, 2023, 9 pages.

* cited by examiner

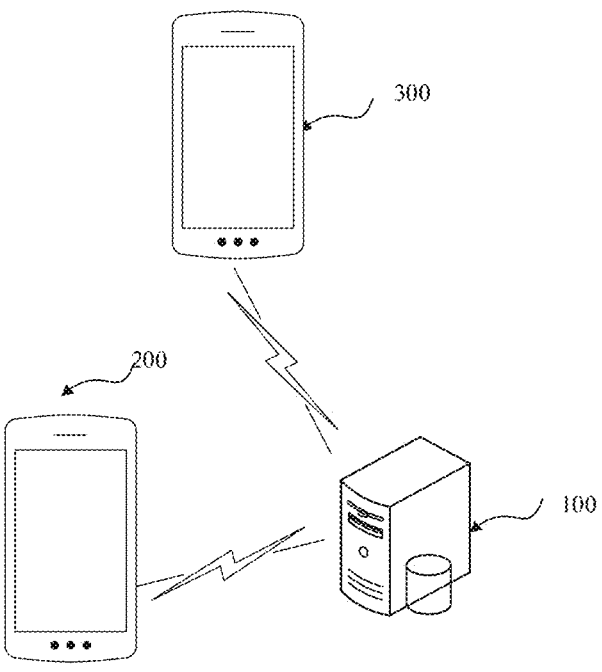

FIG. 1

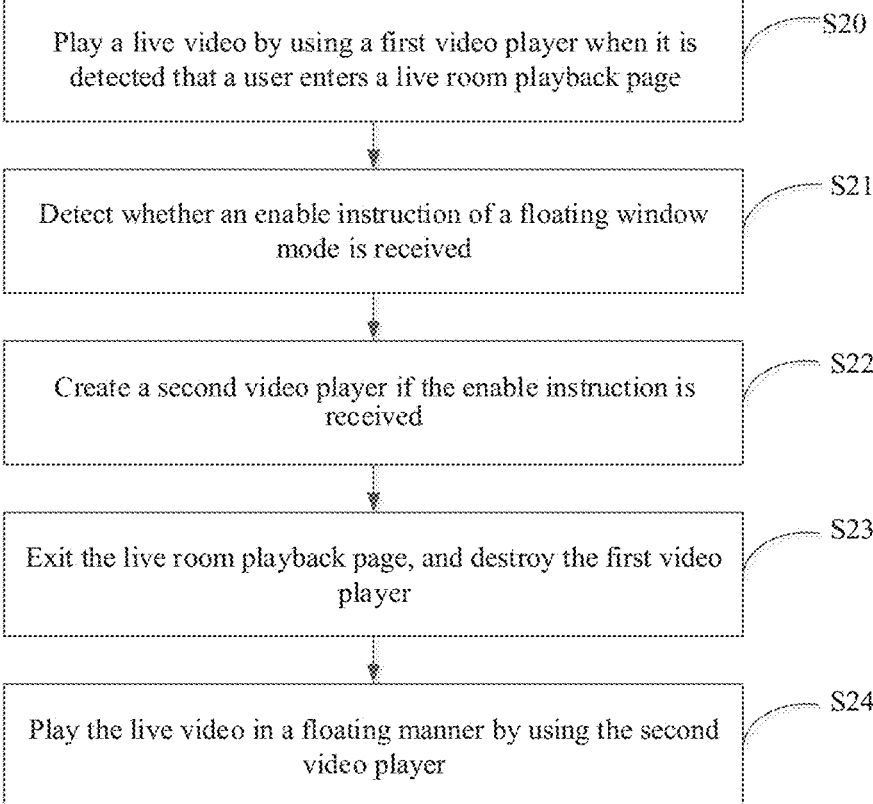

Play a live video by using a first video player when it is detected that a user enters a live room playback page ——S20

Detect whether an enable instruction of a floating window mode is received ——S21

Create a second video player if the enable instruction is received ——S22

Exit the live room playback page, and destroy the first video player ——S23

Play the live video in a floating manner by using the second video player ——S24

FIG. 2

FIG. 3a

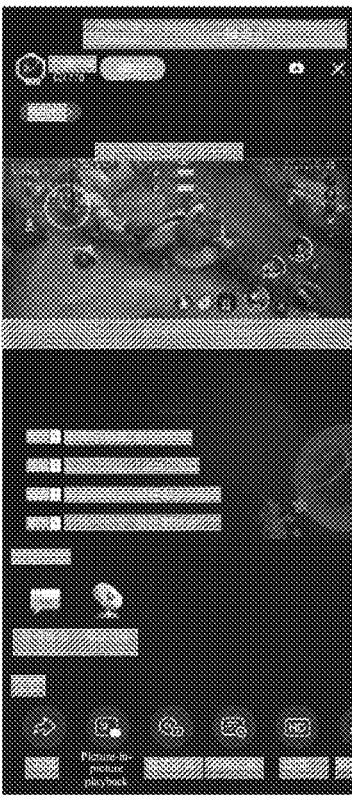

FIG. 3b

FIG. 3c

If the enable instruction is received, determine whether the first video player supports the floating window mode — S40

If it is determined that the first video player does not support the floating window mode, create a second video player — S41

FIG. 4

Create a floating window by using an operating system — S50

Play the live video in the floating window by using the second video player on a live homepage — S51

FIG. 5

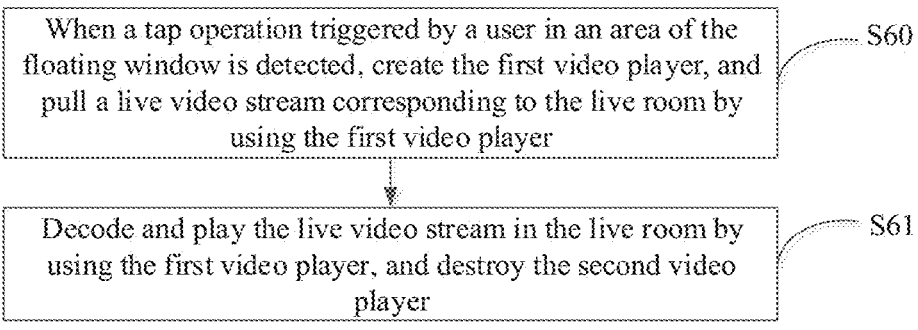

When a tap operation triggered by a user in an area of the floating window is detected, create the first video player, and pull a live video stream corresponding to the live room by using the first video player — S60

Decode and play the live video stream in the live room by using the first video player, and destroy the second video player — S61

FIG. 6

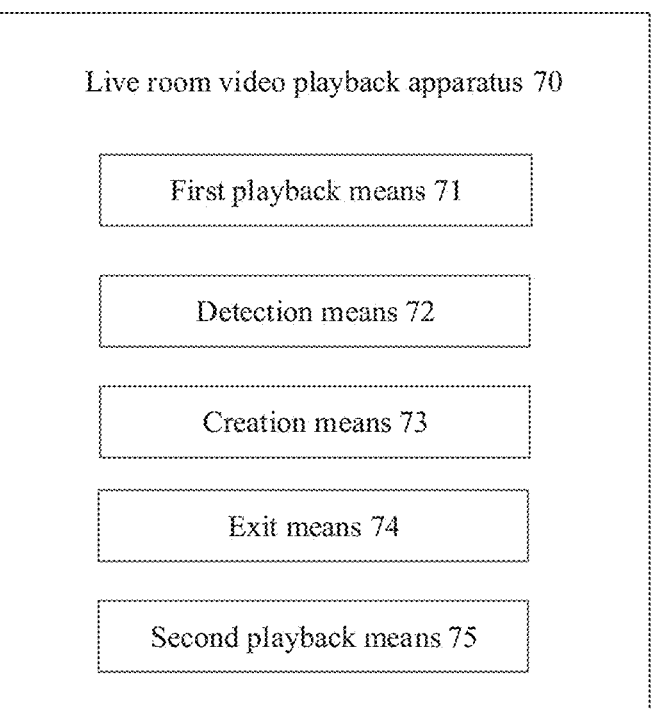

Live room video playback apparatus 70

First playback means 71

Detection means 72

Creation means 73

Exit means 74

Second playback means 75

FIG. 7

LIVE ROOM VIDEO PLAYBACK

CROSS-REFERENCE TO RELATED APPLICATION

The present application is a continuation under 35 U.S.C. 111(a) of PCT International Application No. PCT/CN2022/ 097808, filed on Jun. 9, 2022, which claims priority to Chinese Patent Application No. 202111298165.8, filed on Nov. 4, 2021, the entire contents of which are hereby incorporated by reference in their entirety for all purposes.

TECHNICAL FIELD

This application relates to the field of video technologies, and in particular, to a method, a computing device, and a non-transitory computer-readable storage medium.

BACKGROUND

With development of Internet technologies and popularization of mobile terminals, the livestreaming industry also develops rapidly. Increasingly more persons view live videos in live rooms by using livestreaming clients.

SUMMARY

According to a first aspect of the embodiments of this application, a method is provided, including:

in response to detecting that a user enters a live room playback page, playing a live video by using a first video player;

in response to detecting that an enable instruction of a floating window mode is received, creating a second video player;

exiting the live room playback page, and destroying the first video player; and playing the live video in a floating manner by using the second video player.

According to a second aspect of the embodiments of this application, a computing device is provided, including:

one or more processors; and a memory, storing one or more programs configured to be executed by the one or more processors, the one or more programs including instructions for:

in response to detecting that a user enters a live room playback page, playing a live video by using a first video player;

in response to detecting that an enable instruction of a floating window mode is received, creating a second video player;

exiting the live room playback page, and destroying the first video player; and playing the live video in a floating manner by using the second video player.

According to a third aspect of the embodiments of this application, a non-transitory computer-readable storage medium is provided, where the non-transitory computer-readable storage medium stores one or more programs including instructions that, when executed by one or more processors of a computing device, cause the computing device to perform operations including:

in response to detecting that a user enters a live room playback page, playing a live video by using a first video player;

in response to detecting that an enable instruction of a floating window mode is received, creating a second video player;

exiting the live room playback page, and destroying the first video player; and playing the live video in a floating manner by using the second video player.

BRIEF DESCRIPTION OF DRAWINGS

FIG. 1 is a schematic diagram of an environment of a live room video playback method according to some embodiments of this application;

FIG. 2 is a flowchart of some embodiments of a live room video playback method according to this application;

FIG. 3a to FIG. 3c are schematic diagrams of a process of enabling a floating window mode according to an implementation of this application;

FIG. 4 is a schematic flowchart of detailed steps of creating a second video player if an enable instruction is received according to an implementation of this application;

FIG. 5 is a schematic flowchart of detailed steps of playing a live video in a floating manner by using a second video player according to an implementation of this application;

FIG. 6 is a flowchart of some embodiments of a live room video playback method according to this application;

FIG. 7 is a program means diagram of some embodiments of a live room video playback apparatus according to this application.

DESCRIPTION OF EMBODIMENTS

Figure 8:
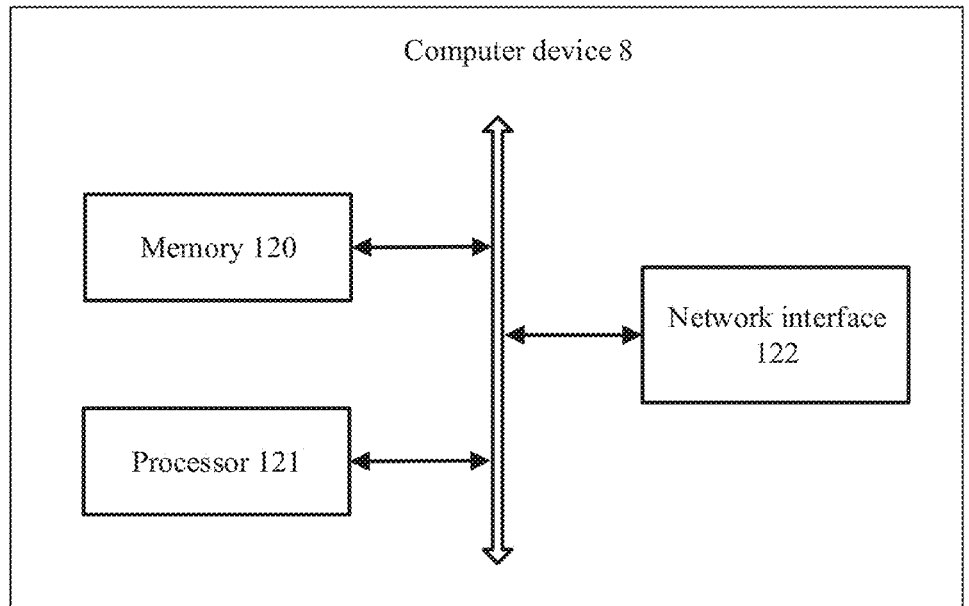
FIG. 8 is a schematic diagram of a hardware structure of a computer device that performs a live room video playback method according to some embodiments of this application.

The following further describes the advantages of this application with reference to the accompanying drawings and embodiments.

The example embodiments are described in detail herein and the examples are shown in the accompanying drawings. When the following descriptions relate to the accompanying drawings, unless otherwise specified, a same number in different accompanying drawings represents a same or similar element. The implementations described in the following example embodiments do not represent all implementations consistent with this disclosure. On the contrary, they are only examples of apparatuses and methods that are described in the appended claims in detail and that are consistent with some aspects of this disclosure.

The terms used in this disclosure are merely used to describe embodiments, and are not intended to limit this disclosure. The terms "a", "said", and "the" of singular forms used in this disclosure and the appended claims are also intended to include plural forms, unless otherwise specified in the context clearly. It should be further understood that the term "and/or" used in this specification indicates and includes any or all possible combinations of one or more associated listed items.

It should be understood that although terms "first", "second", "third", and the like may be used in this disclosure to describe various types of information, the information is not limited by these terms. These terms are merely used to distinguish between information of a same type. For example, without departing from the scope of this disclosure, first information may also be referred to as second information. Similarly, the second information may also be referred to as the first information. Depending on the context, for example, the word "if" used herein can be interpreted as "while", "when", or "in response to determining".

In the descriptions of this application, it should be understood that numerical symbols before steps do not indicate a sequence of performing the steps, but are merely used to facilitate description of this application and differentiation of each step, and therefore cannot be construed as a limitation on this application.

The inventor finds that when a user views a live video in a live room by using a terminal device with an iOS version, the user cannot view the live video in a floating window mode, resulting in poor user experience.

In some embodiments, a method is provided, including: playing a live video by using a first video player when it is detected that a user enters a live room playback page; detecting whether an enable instruction of a floating window mode is received; creating a second video player if the enable instruction is received; exiting the live room playback page, and destroying the first video player; and playing the live video in a floating manner by using the second video player. In this application, after the enable instruction of the floating window mode triggered by the user is detected, the second video player is created to play a live video of a current live room, so that a livestreaming client can support a floating window mode, improving user experience.

FIG. 1 is a schematic diagram of an application scenario according to some embodiments of this application. The application scenario includes a livestreaming server 100, an online streamer terminal 200, and a viewer terminal 300. The livestreaming server 100, the online streamer terminal 200, and the viewer terminal 300 are located in a wireless network or a wired network. The livestreaming server 100 may exchange data with the online streamer terminal 200 and the viewer terminal 300. In some implementations, a quantity of online streamer terminals 200 (only one shown in FIG. 1) and a quantity of viewer terminals 300 (only one shown in FIG. 1) may not be limited. The viewer terminal 300 and the online streamer terminal 200 may use the livestreaming server 100 as a transmission medium, and implement mutual data exchange through the Internet.

In the embodiments of this application, the livestreaming server 100 may be a separate server, a server cluster, a local server, or a cloud server. A type of the server may not be limited in the embodiments of this application. The online streamer terminal 200 and the viewer terminal 300 each may be a mobile phone, a smartphone, a notebook computer, a desktop computer, a tablet computer, a personal digital assistant (PDA), a media player, a smart television, a wearable electronic device, or the like. A type of the terminal device may not be limited in the embodiments of this application.

In the embodiments, a livestreaming client may be installed in the online streamer terminal 200, and the livestreaming client is used by an online streamer to implement video live streaming. The livestreaming client may be a computer application (APP) installed in the online streamer terminal 200, or may be a web client. The web client may be an application developed based on a web architecture.

In the embodiments, a viewer client may be installed in the viewer terminal 300, and the viewer client is used by a viewer to receive livestreaming content, and present livestreaming content. The viewer client may be a computer application (APP) installed in the viewer terminal 300, or may be a web client. The web client may be an application developed based on the web architecture.

FIG. 2 is a schematic flowchart of a live room video playback method according to some embodiments of this application. The live room video playback method in this application may be applied to an iOS version of livestreaming APP. It may be understood that the flowchart in the method embodiments is not used to limit a step execution sequence. It can be learned from the figure that, the live room video playback method provided in the embodiments includes the following:

Step S20: Play a live video by using a first video player when it is detected that a user enters a live room playback page.

In some embodiments, after enabling the livestreaming APP, the user may select one of a plurality of live rooms displayed on a live homepage and enter the live room to view a live video. When the user selects the live room and enters a playback page of the selected live room to view the live video, the livestreaming APP creates the first video player to play the live video.

In an example implementation, the step of playing a live video by using a first video player when it is detected that a user enters a live room playback page may include: when it is detected that the user enters the live room playback page, pulling a live video stream corresponding to a live room from a preset livestreaming server by using the first video player; and decoding and playing the live video stream by using the first video player.

In some embodiments, when the user selects the live room and enters the selected live room to view the live video, the livestreaming APP pulls a live video stream corresponding to a live room from the preset livestreaming server, and then the livestreaming APP may decode and play the live video stream by using the created first video player.

The first video player is a video player that does not support a floating window mode (a picture-in-picture mode), and the first video player is an ijkplayer in some embodiments, ijkplayer is an ffplay-based lightweight Android/iOS video player that is open sourced by bilibili.

The livestreaming server is a server that stores live video streams of all live rooms. In the embodiments, the livestreaming APP may pull a live video stream of a current live room from the livestreaming server according to an address of the live video stream of the live room.

Step S21: Detect whether an enable instruction of a floating window mode is received.

In some embodiments, the floating window mode is a video playback mode in which a live video is played in a floating window manner. Usually, the floating window mode may also be referred to as a picture-in-picture mode. The enable instruction is used to enable the floating window mode to play a video of a live room.

When the user enters the live room playback page to view the video, the user may select the floating window mode to play the live video currently viewed by the user in the live room. In some embodiments, the user may tap a preset button on the live playback page to trigger the enable instruction of the floating window mode, or the user may execute a preset operation on the live playback page to trigger the enable instruction of the floating window mode. This is not limited in the embodiments.

In some scenarios, when the user needs to enable the floating window mode, the user may tap a floating window panel wakeup button in advance. After detecting a floating window panel wakeup instruction triggered by tapping the floating window panel wakeup button by the user, the livestreaming APP pops up a floating window panel on a page currently displayed by the livestreaming APP. Then, the user may tap a floating window button on the floating window panel to trigger the enable instruction of the floating window mode. Finally, when detecting the enable instruction of the floating window mode triggered by the user, the livestreaming APP plays the live video in the floating window mode.

It should be noted that the floating window panel in the embodiments includes at least the floating window button, and the floating window button is a button used to trigger generation of the enable instruction of the floating window mode.

As an example, refer to FIG. 3a to FIG. 3c. When viewing the video in the live room, the user may first tap a " . . . " button in FIG. 3a, to evoke the floating window panel. Then, the user may continue to tap a "picture-in-picture playback" button in FIG. 3b, to trigger the enable instruction of the floating window mode. After the enable instruction of the floating window mode triggered by the user is detected, a series of processing operations are performed according to the instruction, to obtain a page shown in FIG. 3c.

Step S22: Create a second video player if the enable instruction is received.

In some embodiments, the second video player is a video player that can support the floating window mode. In the embodiments, the second video player is an AVplayer. AVplayer is a full-featured audio and video player that can play files in any format and is suitable for iPhone/iPod/iPad. A file may be transferred to the player by using iTunes or through Wi-Fi. Alternatively, a video file may be directly opened or a file may be downloaded from a server such as Ftp/Samba/UPnP by using a built-in download client. There is also a built-in photo browser for viewing photos.

In an example implementation, when the second video player is created, an attribute of the second video player may be set to hidden and mute, that is, a playback mode of the second video player is set to an abnormal playback mode.

The abnormal playback mode is relative to a normal playback mode. In the embodiments, the abnormal playback mode means that the video player silently plays the live video in the background, that is, the video player is hidden in the background and plays the video without making a sound. In some embodiments, the second video player may decode the live video stream in the background, and silently play a decoded live picture by using a preset frame rate. The preset frame rate is a preset playback frame rate, and the frame rate is a relatively low frame rate in some embodiments. For example, the preset frame rate is 1 frame/s.

In the embodiments, after decoding the live video stream in the background, the second video player silently plays the decoded live picture at an extremely low frame rate, so that performance consumption of the second video player can be reduced.

It should be noted that the normal playback mode is that the player plays the live video with a normal sound at a normal frame rate in the foreground. Normal sound playback in the embodiments refers to playing by using a default volume. The normal frame rate in the embodiments refers to playing by using an encoded frame rate in the live video stream. For example, the encoded frame rate in the live video stream is 60 frames per second, and in this case, the video is also played in a manner of 60 frames per second when the live video stream is decoded and played.

In this implementation, the first video player is first created when it is detected that the user enters the live room playback page to view the live video, and the second video player is created only after that the floating window mode triggered by the user in the live room is enabled is received.

In another implementation, the first video player and the second video player may be created simultaneously when it is detected that the user enters the live room to view the live video. After the two video players are created simultaneously, to avoid mutual interference between the two video players, the first video player may be set to a normal playback mode, and the second video player may be set to an abnormal playback mode.

Step S23: Exit the live room playback page, and destroy the first video player.

In the embodiments, after the enable instruction is received, a playback page of the current live room is further exited, that is, the current live room is exited. In addition, to prevent the first video player from occupying resources, the first video player may be destroyed, to release the resources occupied by the first video player. In an implementation, after the live room playback page is exited, the first video player may not be destroyed, but the first video player is only closed in the foreground and hidden in the background for silent playback.

In an implementation, after the playback page of the current live room is exited, an upper-level page of the playback page of the current live room may be returned and displayed, for example, the live homepage is returned and displayed.

In another implementation, after the playback page of the current live room is exited, a desktop of a terminal system may alternatively be returned and displayed.

In another implementation, after the playback page of the current live room is exited, a page of another application may alternatively be returned and displayed, for example, a page of a browser APP is displayed.

In an example implementation, referring to FIG. 4, the step of creating a second video player if the enable instruction is received may include: Step S40: If the enable instruction is received, determine whether the first video player supports the floating window mode. Step S41: If it is determined that the first video player does not support the floating window mode, create the second video player.

In some embodiments, whether the first video player supports the floating window mode may be determined by determining whether the first video player is a preset video player. The preset player is a preset video player that supports the floating window mode.

As an example, it may be determined whether the first video player is an AVplayer to determine whether the first video player supports the floating window mode.

In the embodiments, when it is determined that the first video player does not support the floating window mode, the second video player may be created. When it is determined that the first video player supports the floating window mode, the second video player does not need to be created.

In the embodiments, to avoid mutual interference caused by simultaneous playback of the live video played in the live room and the live video played in the floating window mode, the live room page may be directly exited in the embodiments after the second video player is created.

Step S24: Play the live video in a floating manner by using the second video player.

In some embodiments, after being created, the second video player may pull a live video stream of a current live room from the livestreaming server according to an address of the live video stream of the live room. The livestreaming server is a server that stores live videos of all live rooms.

When the second video player successfully pulls a stream from the livestreaming server and obtains the live video stream, the second video player parses the live video stream, and then plays a parsed live picture in a floating manner.

In an example implementation, referring to FIG. 5, the step of playing the live video in a floating manner by using the second video player may include: Step S50: Create a floating window by using an operating system. Step S51: Play the live video in the floating window by using the second video player.

In some embodiments, the operating system is an operating system of a terminal device. In the embodiments, the operating system is an iOS system. The floating window is a window that is floating. The floating window can display a live picture.

In the embodiments, after the second video player is created, the second video player is hosted on the operating system. Then, the operating system creates a floating window. In this way, the second video player can play a decoded live picture in the floating window.

In an example implementation, referring to FIG. 6, after the step of playing the live video in a floating manner by using the second video player, the method further includes:

Step S60: When a tap operation triggered by the user in an area of the floating window is detected, create the first video player, and pull a live video stream corresponding to the live room by using the first video player.

In some embodiments, the user may switch the current floating window mode back to a live room playback mode by performing a tap operation in the area of the floating window. In some embodiments, the user may tap any location in the area belonging to the floating window to trigger the current floating window mode to be switched back to the live room playback mode. Alternatively, the user may tap a preset location in the area belonging to the floating window to trigger the current floating window mode to be switched back to the live room playback mode. The preset location is a part of a preset area of the floating window.

In the embodiments, after the tap operation triggered by the user is detected, the first video player is recreated. After the first video player is created, the first video player pulls the live video stream of the live room from the livestreaming server according to the address of the live video stream of the live room.

It may be understood that when the first video player is always in the background and is not destroyed, the first video player does not need to be recreated after the tap operation triggered by the user is detected.

Step S61: Decode and play the live video stream in the live room by using the first video player, and destroy the second video player.

In some embodiments, after the first video player is created, the live room may be entered and the first video player may be used to decode and play the live video stream.

In the embodiments, to prevent the second video player from occupying resources, the second video player may be destroyed when the live video stream is decoded and played in the live room by using the first video player, to release the resources occupied by the second video player.

In the embodiments, the method includes: playing a live video by using a first video player when it is detected that a user enters a live room playback page; detecting whether an enable instruction of a floating window mode is received; creating a second video player if the enable instruction is received, exiting the live room playback page, and destroying the first video player; and playing the live video in a floating manner by using the second video player. In this application, after the enable instruction of the floating window mode triggered by the user is detected, the second video player is created to play the live video of the current live room, so that a livestreaming client can support the floating window mode, improving user experience.

FIG. 7 is a program means diagram of some embodiments of a live room video playback apparatus 70 according to this application.

In the embodiments, the live room video playback apparatus 70 includes a series of computer-readable instructions stored in a memory. When the computer-readable instructions are executed by a processor, live room video playback functions in the embodiments of this application can be implemented. In some embodiments, based on an operation implemented by each part of the computer-readable instructions, the live room video playback apparatus 70 may be divided into one or more means, and may be divided into the following means:

a first playback means 71, configured to play a live video by using a first video player when it is detected that a user enters a live room playback page;

a detection means 72, configured to detect whether an enable instruction of a floating window mode is received;

a creation means 73, configured to create a second video player if the enable instruction is received;

an exit means 74, configured to exit the live room playback page, and destroy the first video player; and a second playback means 75, configured to play the live video in a floating manner by using the second video player.

In an example implementation, the creation means 73 is further configured to: if the enable instruction is received, determine whether the first video player supports the floating window mode; and if it is determined that the first video player does not support the floating window mode, create the second video player.

In an example implementation, the live room video playback apparatus 70 further includes a setting means.

The setting means is configured to set an attribute of the second video player to hidden and mute.

In an example implementation, the second playback means 75 is further configured to create a floating window by using an operating system; and play the live video in the floating window by using the second video player.

In an example implementation, the first playback means 71 is further configured to: when it is detected that the user enters the live room playback page, pull a live video stream corresponding to a live room from a preset livestreaming server by using the first video player; and decode and play the live video stream by using the first video player.

In an example implementation, the creation means 73 is further configured to: when a tap operation triggered by the user in an area of the floating window is detected, create the first video player, and pull a live video stream corresponding to a live room by using the first video player.

The first playback means 71 is further configured to decode and play the live video stream in the live room by using the first video player, and destroy the second video player.

In an example implementation, the first video player is an ijkplayer, and the second video player is an AVplayer.

In the embodiments, the apparatus is configured to: play a live video by using a first video player when it is detected that a user enters a live room playback page; detect whether an enable instruction of a floating window mode is received; create a second video player if the enable instruction is received; exit the live room playback page, and destroy the first video player; and play the live video in a floating manner by using the second video player. In this application, after the enable instruction of the floating window mode triggered by the user is detected, the second video player is created to play a live video of a current live room, so that a livestreaming client can support a floating window mode, improving user experience.

FIG. 8 is a schematic diagram of a hardware architecture of a computer device 8 suitable for implementing a live room video playback method according to some embodiments of this application. In the embodiments, the computer device 8 is a device that can automatically calculate a value and/or process information based on an instruction that is set or stored in advance. For example, the computer device 8 may be a tablet computer, a notebook computer, a desktop computer, a rack server, a blade server, a tower server, a cabinet server (including an independent server, or a server cluster including a plurality of servers), or the like. As shown in FIG. 8, the computer device 8 at least includes but is not limited to a memory 120, a processor 121, and a network interface 122 that can be communicatively connected to each other through a system bus.

The memory 120 includes at least one type of computer-readable storage medium. The readable storage medium may be volatile or non-volatile. In some embodiments, the readable storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 120 may be an internal storage means of the computer device 8, for example, a hard disk or an internal memory of the computer device 8. In some other embodiments, the memory 120 may be an external storage device of the computer device 8, for example, a removable hard disk, a smart media card (SMC), a secure digital (SD) card, or a flash card that is disposed on the computer device 8. Certainly, the memory 120 may include both an internal storage means of the computer device 8 and an external storage device of the computer device 8. In the embodiments, the memory 120 is generally configured to store an operating system and various application software that are installed on the computer device 8, for example, program code of the live room video playback method. In addition, the memory 120 may be further configured to temporarily store various types of data that have been output or are to be output.

In some embodiments, the processor 121 may be a central processing unit (CPU), a controller, a microcontroller, a microprocessor, or another live room video playback chip. The processor 121 is usually configured to control an overall operation of the computer device 8, for example, perform control and processing related to data exchange or communication performed by the computer device 8. In the embodiments, the processor 121 is configured to run program code stored in the memory 120 or process data.

The network interface 122 may include a wireless network interface or a wired network interface, and the network interface 122 is usually configured to establish a communication link between the computer device 8 and another computer device. For example, the network interface 122 is configured to connect the computer device 8 to an external terminal by using a network, to establish a data transmission channel and a communication link between the computer device 8 and the external terminal. The network may be a wireless or wired network such as an Intranet, the Internet, a global system for mobile communications (GSM), a wideband code division multiple access (WCDMA), a 4G network, a 5G network, Bluetooth, or Wi-Fi.

It should be noted that FIG. 8 shows only a computer device with the components 120 to 122. However, it should be understood that implementation of all the shown components is not required, and more or fewer components may alternatively be implemented.

In the embodiments, the live room video playback method stored in the memory 120 may be further divided into one or more program means to be executed by one or more processors (the processor 121 in the embodiments), to complete this application.

Some embodiments of this application provides a computer-readable storage medium, storing computer-readable instructions, and the computer-readable instructions are executed by a processor to implement the steps of the live room video playback method in the embodiments.

In the embodiments, the computer-readable storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, or the like. In some embodiments, the computer-readable storage medium may be an internal storage unit of a computer device, for example, a hard disk or an internal memory of the computer device. In some other embodiments, the computer-readable storage medium may be an external storage device of the computer device, for example, a removable hard disk, a smart media card (SMC), a secure digital (SD) card, or a flash card that is disposed on the computer device. Certainly, the computer-readable storage medium may alternatively include both an internal storage unit of the computer device and an external storage device of the computer device. In the embodiments, the computer-readable storage medium is generally configured to store an operating system and various application software that are installed on the computer device, for example, program code of the live room video playback method in the embodiments. In addition, the computer-readable storage medium may be further configured to temporarily store various types of data that have been output or are to be output.

The apparatus embodiments described above are only examples, and units described as separate parts may or may not be physically separated, and parts displayed as units may or may not be physical units, that is, may be located at one position, or may be distributed on at least two network units. Some or all of the means may be selected based on an actual need to achieve the objective of the solutions of the embodiments of this application. Persons of ordinary skill in the art may understand and implement the embodiments without creative efforts.

Based on the foregoing descriptions of the implementations, persons of ordinary skill in the art may clearly understand that the implementations may be implemented by software in addition to a universal hardware platform, or certainly, may be implemented by hardware. Persons of ordinary skill in the art can understand that all or some of the processes in the methods in the foregoing embodiments may be implemented by instructing related hardware by using computer-readable instructions. The program may be stored in a computer-readable storage medium. The processes of the embodiments of the methods may be performed when the program is executed. The storage medium may be a magnetic disk, an optical disc, a read-only memory (ROM), a random access memory (RAM), or the like.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A method, comprising:

in response to detecting that a user enters a live room playback page, playing a live video by using a first video player;

in response to detecting that an enable instruction of a floating window mode is received, creating a second video player;

exiting the live room playback page, and destroying the first video player; and playing the live video in a floating manner by using the second video player;

wherein in response to detecting that the enable instruction of the floating window mode is received, creating the second video player comprises:

in response to detecting that the enable instruction is received:

in accordance with a determination that the first video player does not support the floating window mode, creating the second video player, wherein the second video player is different from the first video player and supports the floating window mode.

2. The method according to claim 1, after the step of creating the second video player, the method further comprising:

setting an attribute of the second video player to hidden and mute.

3. The method according to claim 1, wherein playing the live video in the floating manner by using the second video player comprises:

creating a floating window by using an operating system; and playing the live video in the floating window by using the second video player.

4. The method according to claim 1, wherein in response to detecting that the user enters the live room playback page, playing the live video by using the first video player comprises:

in response to detecting that the user enters the live room playback page, pulling a live video stream corresponding to a live room from a preset livestreaming server by using the first video player; and decoding and playing the live video stream by using the first video player.

5. The method according to claim 3, after the step of playing the live video in the floating manner by using the second video player, the method further comprising:

in response to detecting a tap operation triggered by the user in an area of the floating window, creating the first video player, and pulling a live video stream corresponding to a live room by using the first video player; and decoding and playing the live video stream in the live room by using the first video player, and destroying the second video player.

6. The method according to claim 1, wherein the first video player is an ijkplayer, and the second video player is an AVplayer.

7. A computing device, comprising:

one or more processors; and a memory, storing one or more programs configured to be executed by the one or more processors, the one or more programs comprising instructions for:

in response to detecting that a user enters a live room playback page, playing a live video by using a first video player;

in response to detecting that an enable instruction of a floating window mode is received, creating a second video player;

exiting the live room playback page, and destroying the first video player; and playing the live video in a floating manner by using the second video player;

wherein in response to detecting that the enable instruction of the floating window mode is received, creating the second video player comprises:

in response to detecting that the enable instruction is received:

in accordance with a determination that the first video player does not support the floating window mode, creating the second video player, wherein the second video player is different from the first video player and supports the floating window mode.

8. The computing device according to claim 7, wherein the one or more programs further comprise instructions for:

after the step of creating the second video player, setting an attribute of the second video player to hidden and mute.

9. The computing device according to claim 7, wherein playing the live video in the floating manner by using the second video player comprises:

creating a floating window by using an operating system; and playing the live video in the floating window by using the second video player.

10. The computing device according to claim 7, wherein in response to detecting that the user enters the live room playback page, playing the live video by using the first video player comprises:

in response to detecting that the user enters the live room playback page, pulling a live video stream corresponding to a live room from a preset livestreaming server by using the first video player; and decoding and playing the live video stream by using the first video player.

11. The computing device according to claim 9, wherein the one or more programs further comprise instructions for:

after the step of playing the live video in the floating manner by using the second video player, in response to detecting a tap operation triggered by the user in an area of the floating window, creating the first video player, and pulling a live video stream corresponding to a live room by using the first video player; and decoding and playing the live video stream in the live room by using the first video player, and destroying the second video player.

12. The computing device according to claim 7, wherein the first video player is an ijkplayer, and the second video player is an AVplayer.

13. A non-transitory computer-readable storage medium, wherein the non-transitory computer-readable storage medium stores one or more programs comprising instructions that, when executed by one or more processors of a computing device, cause the computing device to perform operations comprising:

in response to detecting that a user enters a live room playback page, playing a live video by using a first video player;

in response to detecting that an enable instruction of a floating window mode is received, creating a second video player;

exiting the live room playback page, and destroying the first video player; and playing the live video in a floating manner by using the second video player;

wherein in response to detecting that the enable instruction of the floating window mode is received, creating the second video player comprises:

in response to detecting that the enable instruction is received:

in accordance with a determination that the first video player does not support the floating window mode, creating the second video player, wherein the second video player is different from the first video player and supports the floating window mode.

14. The non-transitory computer-readable storage medium according to claim 13, the operations further comprising:

after the step of creating the second video player, setting an attribute of the second video player to hidden and mute.

15. The non-transitory computer-readable storage medium according to claim 13, wherein playing the live video in the floating manner by using the second video player comprises:

creating a floating window by using an operating system; and playing the live video in the floating window by using the second video player.

16. The non-transitory computer-readable storage medium according to claim 13, wherein in response to detecting that the user enters the live room playback page, playing the live video by using the first video player comprises:

in response to detecting that the user enters the live room playback page, pulling a live video stream corresponding to a live room from a preset livestreaming server by using the first video player; and decoding and playing the live video stream by using the first video player.

17. The non-transitory computer-readable storage medium according to claim 15, the operations further comprising:

after the step of playing the live video in the floating manner by using the second video player, in response to detecting a tap operation triggered by the user in an area of the floating window, creating the first video player, and pulling a live video stream corresponding to a live room by using the first video player; and decoding and playing the live video stream in the live room by using the first video player, and destroying the second video player.

* * * * *